UNITED STATES PATENT OFFICE.

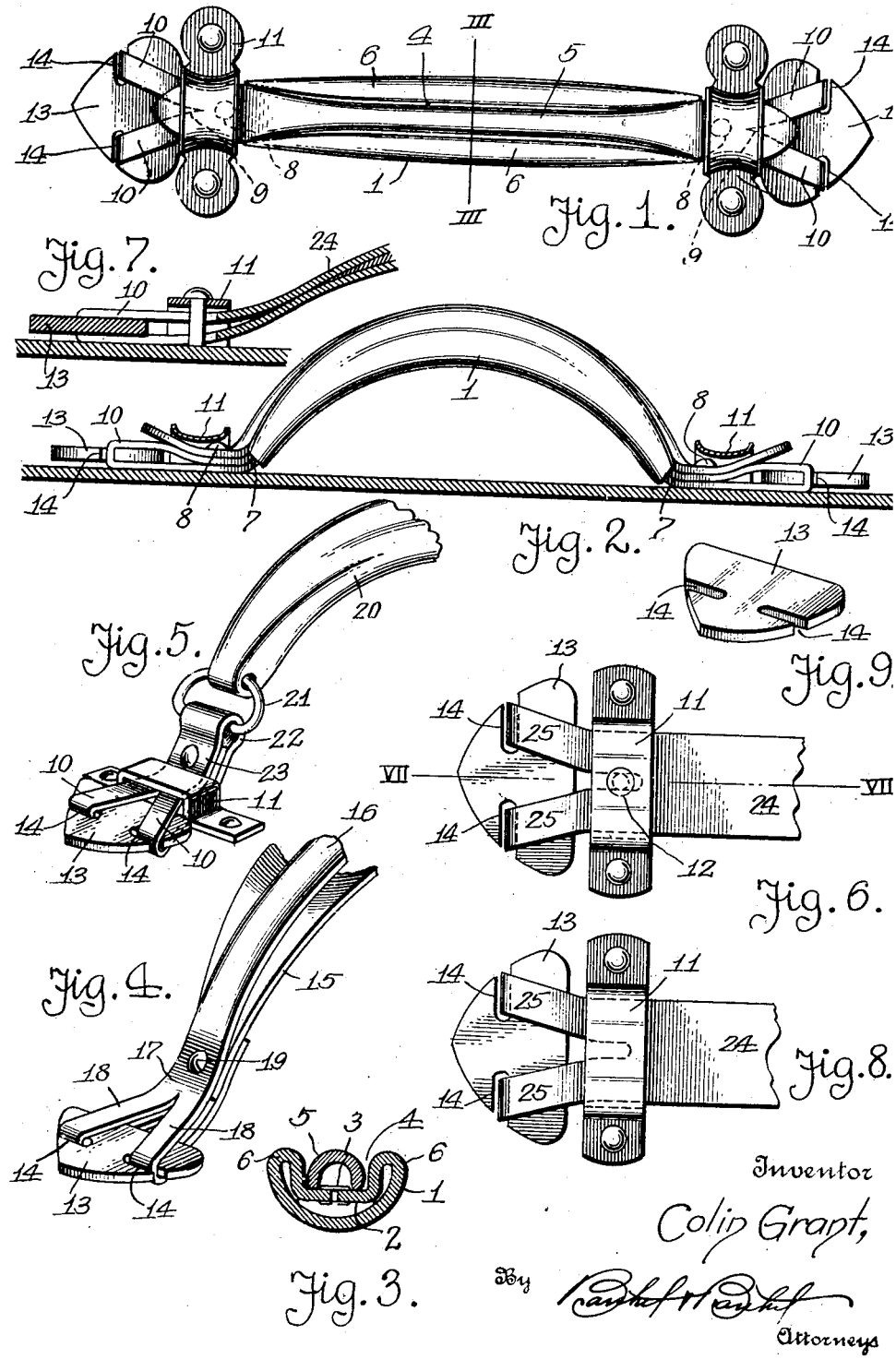

COLIN GRANT, OF JACKSON, MICHIGAN.

DETACHABLE HANDLE.

1,376,528. Specification of Letters Patent. Patented May 3, 1921.

Application filed August 18, 1919. Serial No. 318,375.

*To all whom it may concern:*

Be it known that I, COLIN GRANT, a citizen of the United States of America, residing at Jackson, in the county of Wayne and State of Michigan, have invented certain new and useful Improvements in Detachable Handles, of which the following is a specification, reference being had therein to the accompanying drawings.

This invention relates to detachable handles for trunks, valises, hand bags, chests and other receptacles, and my invention aims to provide a strap or hand grip member which may be easily and quickly installed in lieu of another strap or hand grip member when the same is injured or broken. It is in this connection that my handle may be advantageously used for repairing trunks, suitcases and similar receptacles which ordinarily have a strap handle held under staples or in suspension members, when said strap handles have the ends thereof torn, broken or otherwise injured to such an extent that one or both ends of the handle is loose, and in a great many instances lost during transit.

To this end, I have devised a handle having detachable heads, tabs or terminal pieces which permit of the handle being easily and quickly placed in position on a trunk or other receptacle and loosely held in the usual manner, and should the handle be injured or considerably worn, it is possible to quickly substitute a new handle. This is accomplished without the necessity of sending the trunk or receptacle to a repair shop, since the handles may be purchased by the owner of the trunk or receptacle and installed without tools or any special equipment.

My invention will be hereinafter considered and then claimed, and reference will now be had to the drawings, wherein—

Figure 1 is a plan of a high grade handle in accordance with my invention;

Fig. 2 is a side elevation of the same;

Fig. 3 is a cross sectional view taken on the line III—III of Fig. 1;

Fig. 4 is a perspective view of one end of another grade of handle in accordance with my invention;

Fig. 5 is a similar view of another form of handle provided with the improvement;

Fig. 6 is a plan of a portion of a trunk handle including the improvement;

Fig. 7 is a longitudinal sectional view taken on the line VII—VII of Fig. 6;

Fig. 8 is a view similar to Fig. 6 showing another adaptation of the trunk handle; and Fig. 9 is a perspective view of the detached tab head.

Referring first to Figs. 1, 2 and 3, I show a high grade of valise handle which has been put into practice, the handle in this instance being composed of a grip member 1 and a center member 5. The member 1 is channel or U-shaped in cross section and has its edges inturned, as at 2, and connected by staples 3 or other fastening means, with the inturned edges 2 of the member 1 forming a channel for the center member 5 which is preferably inverted U-shaped the greater part of its length. In shaping the hand grip member 1 the inturned edges 2 thereof are rolled, as at 6, so that the hand grip member will have compressible side walls that may be brought into close relation to the center member 5, particularly when the handle is gripped and considerable weight elevated thereby. This permits of the handle conforming to a hand without presenting any seam or rough edges which would tend to blister or otherwise injure a hand gripping the handle, and the center member 5 prevents complete collapse of the member 1 besides adding strength and a degree of rigidity thereto.

When forming the hand grip member 1 the staples 3 or fastening means at the ends of said member are employed for holding the inner ends of tabs 7 within the ends of the member 1 and it is through the medium of these tabs that the ends of the center member 5 may be riveted or otherwise connected to the inner ends of the tabs, as at 8.

The tabs 7 are each made of a single strap or piece of leather doubled on itself with the plies thereof held together by the staples 3 and the rivets 8, and each tab is bifurcated or slitted, as at 9, so as to provide loop portions 10.

The tabs 7 may be easily threaded under a strap or suspension member 11 riveted or otherwise connected to the wall of a suit case or other receptacle, said strap or suspension member being in many instances made of metal. As shown in Fig. 1, the central portion of the strap is somewhat semi-cylindrical, and in Figs. 5, 6 and 8, the central portion of the strap or suspension member is somewhat inverted G-shaped, and as shown in Fig. 6 it may have an additional holding rivet 12. This is particularly true in connection with trunks, chests or any large receptacle having a wide handle necessitating a wide strap or suspension member.

Retaining the tab 7 under the strap 11 is a detachable tab head 13 substantially triangular in plan and having its side edges provided with opposed slits or slots 14 adapted to receive the loop portions 10 of the tab 7 with the base or large end of the head extending into the diverging loop portions of the tab, so that any movement of the tab head causes the walls of the loop portions to press inwardly on the tab head and more firmly force the same into engagement with the loop portions. In other words, it is practically impossible for the head 13 to become accidentally displaced while the handle is in use and even while the handle is loose, the retractile force of the diverging loop portions 10 is sufficient to maintain the loop portions in engagement with the head 13. A manual operation is necessary in order to remove the head 13 so that the tab may be withdrawn from under the strap 11, otherwise the tab is held just as though the head 13 were integral therewith.

As shown in Fig. 4, the handle may be composed of a comparatively flat and flexible hand grip member 15 provided with a center member 16 about which the flat hand grip member 15 may be gathered when the handle is in use. The ends of the center member 16 terminate in tabs 17 having diverging looped portions 18 and the tabs may be held relative to the hand grip member 15 by rivets 19 or other fastening means. The same type of tab head is used in connection with this form of handle.

Another form of handle is shown in Fig. 5 and designated 20, said handle being connected by a loose link 21 to the looped portion 22 of a tab 23, said tab being otherwise constructed similar to the tab 7 so as to receive a detachable head.

Figs. 6, 7 and 8 show a wide trunk handle 24 in the form of a strap which has its ends bifurcated to provide looped portions 25, and as pointed out in the beginning the bifurcation of such a handle may provide clearance for the additional rivet 12 of a trunk strap 11. Since the trunk handle is usually made of one or more plies of leather, it is extremely easy to form the tab loop portions 25.

From the foregoing it will be observed that the manner of attaching a handle to a receptacle permits of the handle being easily and quickly installed, particularly as a substitute for a handle that is considerably worn or in place of a handle that has been lost. It is therefore possible to quickly provide a receptacle with a handle without the use of any tools, and it is in this connection that a spare handle may be carried by a traveler for emergency purposes.

All of the handle forms shown have been placed in use, as well as others, and since the same principle of detachably holding a handle is involved throughout the various forms, it is obvious that I do not care to confine my invention to any precise arrangement of parts other than defined by the appended claims.

What I claim is:—

1. The combination with a receptacle having suspension members or straps, of a handle having bifurcated tabs extending through said suspension members or straps, and detachable means engaging in said handle tabs to hold the bifurcated portions of said tabs separated to prevent the tabs slipping back through said suspension members or straps.

2. The combination set forth in claim 1, and wherein said detachable means have opposed slots to receive the bifurcated portions of said handle tabs.

3. The combination with a receptacle having suspension members or straps, of a handle having tabs extending through said suspension members or straps, said tabs being bifurcated, and detachable means engaging in the bifurcated portions of said handle tabs to hold said tabs in said suspension members or straps.

4. A handle of the character described comprising looped bifurcated tabs, and detachable heads in the looped bifurcations of said tabs.

5. A handle as characterized in claim 4 wherein the heads have opposed slots to receive the looped bifurcated portions of the tabs.

6. A handle having end looped portions, and means insertible in the looped portions from a position between said looped portions to maintain said looped portions in diverging directions to enlarge the ends of said handle, said means being disposed so that any tension on the handle tends to more firmly hold said means in engagement with said handle.

In testimony whereof I affix my signature in the presence of two witnesses.

COLIN GRANT.

Witnesses:
OTTO F. BARTHEL,
KARL H. BUTLER.